(12) United States Patent
Yasuda

(10) Patent No.: US 6,943,772 B2
(45) Date of Patent: Sep. 13, 2005

(54) MAGNETIC DISPLAY DEVICE

(75) Inventor: Michiyuki Yasuda, Tajimi (JP)

(73) Assignee: The Pilot Ink Co., Ltd., Aichi-ken (JP)

( * ) Notice: Subject to any disclaimer, the term of this patent is extended or adjusted under 35 U.S.C. 154(b) by 0 days.

(21) Appl. No.: 09/256,192

(22) Filed: Feb. 24, 1999

(65) Prior Publication Data

US 2002/0018044 A1 Feb. 14, 2002

(30) Foreign Application Priority Data

Feb. 27, 1998 (JP) .............................. 10-064641

(51) Int. Cl.⁷ .............................. G09G 3/34; B32B 5/16
(52) U.S. Cl. ........................ 345/107; 428/323; 434/409
(58) Field of Search ................. 345/107, 111, 345/86, 84, 173, 179; 446/130–139, 146, 147; 434/409; 428/323

(56) References Cited

U.S. PATENT DOCUMENTS

| | | | | |
|---|---|---|---|---|
| 2,853,830 A | * | 9/1958 | Herzog | 446/131 |
| 3,036,388 A | * | 5/1962 | Tate | 434/409 |
| 3,103,751 A | * | 9/1963 | McDonald | 434/409 |
| 3,426,453 A | * | 2/1969 | Etal | 434/409 |
| 3,825,927 A | * | 7/1974 | Passien | 340/815.53 |
| 4,143,472 A | * | 3/1979 | Murata et al. | 434/409 |
| 4,288,936 A | * | 9/1981 | Okutsu | 40/426 |
| 4,921,319 A | * | 5/1990 | Mallik | 283/86 |
| 4,931,019 A | * | 6/1990 | Park | 434/409 |
| 5,594,562 A | * | 1/1997 | Sato et al. | 349/12 |
| 5,674,104 A | * | 10/1997 | Ohashi et al. | 446/132 |
| 5,820,385 A | * | 10/1998 | Ohashi et al. | 434/409 |
| 5,930,026 A | * | 7/1999 | Jacobson et al. | 359/296 |
| 5,972,493 A | * | 10/1999 | Iwasaki et al. | 428/323 |
| 6,200,680 B1 | * | 3/2001 | Takeda et al. | 423/111 |

FOREIGN PATENT DOCUMENTS

| | | |
|---|---|---|
| EP | 0633488 | 1/1995 |
| JP | 54014193 | * 2/1979 |
| JP | 4-175196 | 6/1992 |
| JP | 09-160511 | 6/1997 |
| WO | WO 95/34834 | 12/1995 |

* cited by examiner

Primary Examiner—Xiao Wu
Assistant Examiner—Kevin M. Nguyen
(74) Attorney, Agent, or Firm—Fitzpatrick, Cella, Harper & Scinto

(57) ABSTRACT

A magnetic display device comprising a pair of flat-sheet display members formed of a non-magnetic material having transparency at least on its display surface, and a dispersion medium and magnetic particles held between the flat-sheet display members, wherein the display surface of the flat-sheet display member has luster.

The magnetic display device has a high decorative effect, which can impart luster such as iridescent luster, iridescence and hologram appearance to images formed.

6 Claims, 4 Drawing Sheets

MAGNETIC DISPLAY DEVICE

This application claims the benefit of Japanese Application No. 10-64641 which is hereby incorporated by reference.

BACKGROUND OF THE INVENTION

1. Field of the Invention

This invention relates to a magnetic display device. More particularly, it relates to a magnetic display device on which images appearing upon movement or alignment of magnetic particles present in the magnetic display device can assume color in variety.

2. Related Background Art

As magnetic display devices on which colorful images or writing different from black ones can be displayed, magnetic display devices making use of colored magnetic particles have been used (Japanese Patent Application Laid-open No. 4-175196).

On such magnetic display devices, colorful images different from black ones appear upon migration or alignment of colored magnetic particles which is caused by applying a magnetic pen. As for their color tones, however, a dispersed medium filling the inside and a flat-sheet display member provided on the surface of the magnetic display device make it difficult to perceive sharp color tones visually.

SUMMARY OF THE INVENTION

The present invention aims at eliminating such a difficulty the conventional magnetic display devices have had. Accordingly, it is an object of the present invention to provide a magnetic display device on which images appearing thereon can assume color in variety and which can be more improved in a peculiar beauty and decorative effect.

To achieve the above object, the present invention provides a magnetic display device comprising a pair of flat-sheet display members formed of a non-magnetic material having transparency at least on its display surface, and a dispersion medium and magnetic particles held between the flat-sheet display members; an image being caused to appear or disappear upon movement or alignment of the magnetic particles present between the flat-sheet display members; wherein;

the display surface of the flat-sheet display member has luster.

The present invention also provides a magnetic display device comprising a flat-sheet display member formed of a non-magnetic material having transparency at least on its display surface, and a plurality of microcapsules encapsulating a dispersion medium and magnetic particles, fixed to the under surface of the flat-sheet display member; an image being caused to appear or disappear upon movement or alignment of the magnetic particles present in the microcapsules; wherein;

the display surface of the flat-sheet display member has luster.

In preferred embodiments of the magnetic display device of the present invention, the microcapsules encapsulating the dispersion medium and magnetic particles may be fixed between the flat-sheet display members, the flat-sheet display member may comprise a display member having luster selected from iridescent luster, iridescence and hologram appearance, and a luster layer having luster selected from iridescent luster, iridescence and hologram appearance may be provided on the flat-sheet display member.

In the magnetic display device of the present invention, images are formed by magnetic particles. Hence, in usual instances, images reflecting the color tone of magnetic particles themselves are perceived visually.

In the present invention, the display surface has transparency and also may have luster such as iridescent luster, iridescence and hologram appearance. Hence, images usually appearing can be perceived visually in various color tones.

Accordingly, the flat-sheet display member itself serving for the display in the magnetic display device may have the luster, or a luster layer showing the above optical quality may be provided on the top surface or under surface of the flat-sheet display member.

The luster layer may be constituted of a plurality of luster layers having different optical quality.

DESCRIPTION OF THE PREFERRED EMBODIMENTS

Figure 1:
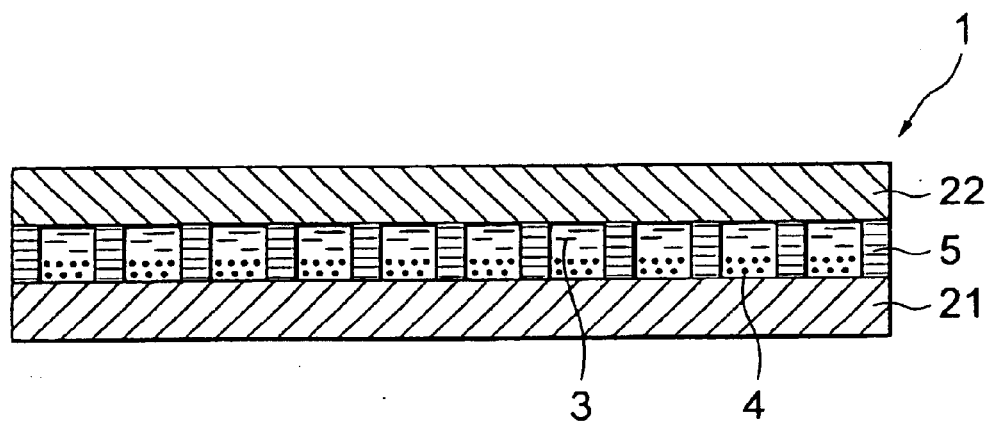
FIG. 1 is a cross-sectional illustration of an embodiment of the magnetic display device according to the present invention.

The magnetic display device of the present invention is constituted basically of a flat-sheet display member formed of a non-magnetic material having transparency at least on its display surface, and a dispersion medium and magnetic particles. Images are caused to appear or disappear upon movement or alignment of the magnetic particles. The present invention is characterized in that the display surface of the flat-sheet display member has luster.

First, the flat-sheet display member having luster will be described below.

The flat-sheet display member may include a sheet having iridescence, a sheet in which an iridescent luster pigment has been dispersed, and a transparent hologram sheet.

Like effect can be obtained also when a luster layer showing optical quality such as iridescent luster, iridescence or hologram appearance is provided on the flat-sheet display member.

The sheet in which an iridescent luster pigment has been dispersed is a film- or sheet-like extruded product comprising a thermoplastic resin or thermosetting resin in which any conventional iridescent luster pigment such as titanium-dioxide-coated mica, iron-oxide- and titanium-dioxide-coated mica, iron-oxide-coated mica, guanine, sericite, basic lead carbonate, acidic lead arsenate or bismuth oxychloride has been dispersed, and is used as the flat-sheet display member.

Such an iridescent luster pigment layer (the luster layer) provided on the transparent flat-sheet display member may be applied in the form of a coating material, ink or the like in which the iridescent luster pigment has been dispersed in a medium containing a binder.

The iridescent luster pigment layer may be a layer in which, e.g., an iridescent luster pigment comprising natural mica particles whose surfaces have been coated with 14 to 68% by weight of titanium oxide to have a coat layer with an optical thickness of from 110 to 415 nm and have a particle size of from 5 to 300 $\mu$m is fixed in a binder in a dispersed state. Such a layer may preferably be used.

It is effective for the iridescent luster pigment layer to have a thickness of from 1 $\mu$m to 400 $\mu$m, and preferably from 3 $\mu$m to 200 $\mu$m, and for the iridescent luster pigment in the layer to be in a content of from 0.1 to 50% by weight, preferably from 0.1 to 40% by weight, and more preferably form 0.2 to 30% by weight.

The optical thickness of the coat layer in the iridescent luster pigment is meant to be the geometrical thickness in combination with a refractive index (refractive index x geometrical thickness). This thickness is concerned with the reflection of light having a certain wavelength. In other words, a layer with a specific optical thickness reflects light having a specific wavelength.

As the iridescent luster pigment layer, e.g., a gold-color iridescent luster pigment comprising natural mica particles whose surfaces have been coated with 26 to 57% by weight of titanium oxide to have a coat layer with an optical thickness of from 180 to 240 nm and have a particle size of from 5 to 125 $\mu$m has a feature that it transmits selectively light having the violet-color wavelength and reflects light which has the yellow-color wavelength of from 550 to 600 nm, having the relation of additive complimentary colors.

Accordingly, in the case of white color or pale color where no image has appeared on the display surface of the magnetic display device, the pigment reflects not only yellow light but also violet light, so that it reflects visible light over its whole wavelength and hence the display surface is perceived visually being white. Also, in the case when dark-color images appear, the violet light at areas where the images have appeared is absorbed, so that the pigment reflects light having yellow-color wavelength and hence the display surface is perceived visually being gold.

A gold-color metallic luster pigment comprising natural mica particles whose surfaces have been coated with titanium oxide and further coated thereon with a non-thermochromic dye or pigment (coated preferably in an amount of from 0.5 to 10% by weight) is also effective. For example, upon appearance of dark-color images on the magnetic display device, a change from a certain color to gold color, e.g., from pink to gold color, can be perceived visually.

Then, when a silver-color iridescent luster pigment is used as the iridescent luster pigment, a pigment comprising natural mica particles whose surfaces have been coated with 14 to 43% by weight of titanium oxide to have a coat layer with an optical thickness of from 110 to 170 nm and have a particle size of from 1 to 180 $\mu$m may preferably be used as the silver-color iridescent luster pigment. Since these numerical values are within the above ranges, any wavelength-selective reflection of light can be prevented. If these are outside the above ranges, the wavelength-selective reflection of light may occur, so that the display does not turn silver when colored. On account of layer-by-layer arrangement of mica, the titanium oxide layers having the above optical characteristics reflect light having the total wavelength of 380 to 700 nm, without any irregular reflection, and hence the display looks silver.

Thus, when no images stand appeared on the display surface of the magnetic display device, the display surface is perceived visually having white color or pale color, and also dark-color images having appeared are perceived visually being silver.

As the iridescent luster pigment, also usable are a metallic-color iridescent luster pigment comprising natural mica particles whose surfaces have been coated with titanium oxide, and a metallic-color iridescent luster pigment in which iron oxide has been further coated on such titanium oxide layers.

A two-color iridescent luster pigment comprising natural mica particles coated with titanium oxide and further coated thereon with a non-thermochromic dye or pigment may also be used.

The mica particles coated with titanium oxide has the action to separate the red-to-violet visible light spectrally into light rays each having corresponding color wavelength, depending on the coating weight of titanium oxide and the optical thickness of coating, to reflect only light having a specific wavelength and transmit other light. Meanwhile, the mica particles do not reflect light irregularly but reflect in parallel lines, and hence the light assumes metallic luster. The light having been transmitted through first layers is absorbed in the underlying layers. Thus, the light with metallic luster, having a specific wavelength, is reflected, and hence the images come to assume a metallic color of specific color.

If the titanium oxide is in a coating weight more than 68% by weight, the pigment may have a poor wavelength selectivity, so that the images do not assume any metallic color. Also, if the iron oxide is in a coating weight less than 4% by weight, the iron oxide further coated can not be well effective, and if it is in a coating weight more than 10% by weight, the images assume a metallic color, but may have too strong color of iron oxide to obtain a clear color change from the metallic color.

Thus, the light having a specific wavelength can be reflected depending on the coating weight of titanium oxide and the optical thickness of coating, and images of gold color, silver color and other metallic color can be perceived visually, depending on the color tones of the display surface of the magnetic display device.

The iridescent luster pigment layer can be formed using a coating material prepared by dispersing the iridescent luster pigment in a medium containing a binder.

The iridescent luster pigment layer can be formed by coating means as exemplified by printing means such as screen printing, offset printing, gravure printing, coater printing, pad (dabber) printing and transferring, and coating means such as brush coating, spray coating, electrostatic coating, electrodeposition coating, curtain coating, roller coating and dip coating.

Alternatively, an iridescent film may be used as the flat-sheet display member, or an iridescent thin-film layer may be used as the luster layer and provided on the transparent flat-sheet display member.

The iridescent film may include an iridescent film comprising a transparent film provided with the iridescent thin-film layer; an optical interference pattern film one or both side(s) of which is/are provided with a metallized layer(s) formed of at least one of an oxide, a sulfide and a fluoride (Japanese Patent Application Laid-open No. 60-32645); and a transparent multi-layer film capable of causing a light interference phenomenon, provided with as an intermediate layer a multi-layer of 100 or more layers formed of polymers having refractive indexes different from one another (available from The Mearl Corporation, U.S.A.; trade name: MEARL IRIDESCENT FILM).

The iridescent thin-film layer may include those constituted of a transparent thin-film layer and a transparent thin-film layer having uneven surface. The transparent thin-film layer may include thin-film layers formed of metal compounds as exemplified by titanium oxide, silicon oxide, zinc oxide, antimony oxide, zinc sulfide, magnesium fluoride and calcium fluoride; thin-film layers formed of thermoplastic resin such as copolymers of vinylidene chloride with vinyl chloride, vinyl acetate or vinyl alcohol and copolymers of any of polyvinyl chloride, polyvinylidene chloride and polystyrene with vinyl chloride or styrene, and having therein fine cells formed by a gas produced by decomposition through means such as light or heat; thin-film layers formed of a vinyl copolymer, cellulose copolymer or urethane copolymer, a curing agent of various types capable of curing the copolymer, a composition having a curable functional group and an organic-substituted silicon compound; and thin-film layers formed of any of the above organic materials and fine particles of an inorganic material such as titanium oxide, aluminum oxide or zirconium oxide. The transparent thin-film layer having uneven surface may include uncolored or colored transparent thin-film layers having a refractive-index difference of at least 0.05 from that of the former thin-film layer and having a visible light ray transmittance of at least 10%, and also those which may cause light scattering at the surface and interior of films, having visible light ray transmittance of at least 50% (Japanese Patent Application Laid-open No. 61-227098).

As a method for forming the luster layer, it is also possible to use an iridescent transfer foil comprising a film base material and superposed successively thereon a resin layer optionally provided, the above iridescent thin-film layer and a commonly available adhesive layer or hot-melt adhesive layer.

It is also possible to use a hologram film as the flat-sheet display member or the luster layer.

The hologram film is obtained by contact-bonding a hologram master to a resin of various types, followed by embossing.

When the hologram film is used as the luster layer, any commonly commercially available hologram transfer foil may also be used.

Such hologram transfer foil is constituted chiefly of a film base material and superposed successively thereon a release layer, an embossed resin layer, a metallized layer optionally provide and a commonly available adhesive layer or hot-melt adhesive layer.

As the hologram transfer foil, those making use of film base materials such as a PET film (biaxially oriented polyethylene terephthalate) with a thickness of from 12 to 75 $\mu$m, a nylon film with a thickness of from 12 to 100 $\mu$m, a polypropylene film with a thickness of from 12 to 50 $\mu$m and a hard vinyl chloride film with a thickness of from 16 to 50 $\mu$m, which may preferably be used in view of dimensional stability and cost. The release layer is used in order to make the film base material separable with ease at the time of transfer, and may be formed using acrylic resin, aminoalkyd resin, urethane resin, epoxy resin or vinyl acetate resin in a thickness of from 0.5 to 5 $\mu$m.

The luster layer described above is not limited to a layer provided on the whole surface of the flat-sheet display member, and may be provided partly or may be provided in combination with a luster layer having different quality.

The luster layer may also be made detachable so as to be changeable for new one.

The magnetic display device may include a magnetic display device comprising a pair of flat-sheet display members formed of a non-magnetic material having transparency, and a dispersion medium (viscous fluid) and magnetic particles held between them.

The above magnetic display device is one in which magnetic particles having stood settled in a hollow between the flat-sheet display members are attracted by magnetism upon bringing a magnetic pen into contact with the surface of the topside flat-sheet display member, to migrate up to the back of the flat-sheet display member surface, so that images are perceived visually by contrast between the dispersion medium and the magnetic particles.

Methods for forming the images are not limited to the one in which the magnetic particles are caused to migrate. For example, flaky magnetic particles having a response to magnetic fields may be used so that images are rendered visible or invisible in accordance with orientation of the magnetic particles, or magnetic particles whose magnetic poles have been color-coded into different color tones may be made to reverse so that images are rendered visible or invisible.

In another embodiment of the magnetic display device, a plurality of small chambers may be provided on the inside of the flat-sheet display members, where the dispersion medium and magnetic particles may be injected into the small chambers and also the chambers may be sealed hermetically so that the dispersion medium and magnetic particles may not leak outside. In still another embodiment, a network member having small chambers in the shape of, e.g., a honeycomb may be provided internally between the flat-sheet display member, where the dispersion medium and magnetic particles may be injected into the small chambers and also the chambers may be sealed hermetically so that the dispersion medium and magnetic particles may not leak outside. Thus, the magnetic particles can be prevented from localizing and also the magnetic particles present in each small chamber can be made uniform in their density.

As an adhesive used to bond the flat-sheet display members to the network member, it may include acrylic resins, vinyl acetate resins, urethane resins and epoxy resins. The flat-sheet display members may be bonded to the network member by, e.g., a method in which the flat-sheet display members are coated with the adhesive and thereafter joined to the network member, and also a method in which the network member is coated with the adhesive on the portions which are to come into contact with the flat-sheet display members and thereafter the flat-sheet display members are joined to the network member.

In the case when the method is used in which the the flat-sheet display members are coated with the adhesive and thereafter joined to the network member, an adhesive in which the iridescent luster pigment has been dispersed beforehand may be used. This makes it unnecessary to provide the luster layer additionally and to produce the magnetic display device simply.

The flat-sheet display member is formed of a non-magnetic material such as plastic and glass, and has transparency at least on its display surface through which images are perceived visually.

Accordingly, the display surface may have no limitations on its color tone and material so long as it is made of the non-magnetic material.

With regard to the transparency, the display surface may have colored transparency. Those having colorless transparency or semitransparency may preferably be used.

The dispersion medium or viscous fluid may preferably comprise water or an organic solvent such as an aliphatic hydrocarbon type solvent and a dye or pigment dissolved or dispersed therein to impart tinting or opecifying properties so that it can enhance the contrast to images formed by the magnetic particles. If necessary, silicic acid, calcium silicate, aluminum silicate, alumina, calcium carbonate, magnesium carbonate, barium sulfate, montmorillonite, Benzidine Yellow, diatomaceous earth, kaolin, clay, an olefin polymer such as polyethylene or polypropylene, an ethylene-vinyl acetate copolymer, a copolymer of an olefin with a monomer, wax of various types, a metal soap, an aliphatic amide, a dextrin fatty acid ester, a hydroxypropyl cellulose ester, a sucrose fatty acid ester, an acylamino acid ester or dibenzylidene sorbitol may be dispersed to adjust the yield value of the dispersion medium so that the images formed by the magnetic particles can be better stabilized, and also to adjust its fluid viscosity so that image display speed can be controlled.

Of the compounds for adjusting the yield value of the dispersion medium, preferably usable are a compound selected from silicic acid, calcium silicate, aluminum silicate, alumina, calcium carbonate, magnesium carbonate, barium sulfate, montmorillonite, Benzidine Yellow, diatomaceous earth, kaolin and clay, and a mixture of a compound selected from an olefin polymer, a copolymer of an olefin with a monomer, wax of various types, a metal soap and a dextrin fatty acid ester with silicic acid or a silicate.

A surface-active agent may optionally be further added.

The magnetic particles may include oxide magnetic materials such as magnetite, hematite, chromium dioxide and ferrite, alloy type metallic materials of any of iron, iron oxide, cobalt and nickel, and those obtained by kneading magnetic particles and resin and pulverizing the kneaded product. The magnetic particles may have particle shape including spheres and also flakes or columns, and may preferably have uniform particle size.

The magnetic particles may have any particle size ranging from fine particles to coarse particles, and may be selected appropriately depending on the quality of the viscous fluid. Those of from 10 to 150 $\mu$m in size may preferably be used.

The iron oxide may include porous iron oxide produced by hydrogen reduction.

The magnetic particles may be coated appropriately with a resin in order to prevent them from wearing.

As the magnetic display device, also usable are a magnetic display device comprising a flat-sheet display member and a plurality of microcapsules encapsulating the dispersion medium and the magnetic particles, fixed to the under surface of the flat-sheet display member, and a magnetic display device comprising a pair of flat-sheet display members and a plurality of microcapsules encapsulating dispersion medium and the magnetic particles, fixed to the both surfaces between the flat-sheet display members.

On such magnetic display devices, images may be rendered visible or invisible by any of methods in which i) magnetic particles having stood settled in the capsules are attracted by magnetism upon bringing a magnetic pen into contact with the surface of the topside flat-sheet display member (the same one as described previously) to migrate up to the backs of the capsule surfaces so that images are perceived visually by contrast between the dispersion medium and the magnetic particles, ii) flaky magnetic particles having a response to magnetic fields are used so that images are rendered visible or invisible in accordance with orientation of the magnetic particles, and iii) magnetic particles whose magnetic poles have been color-coded into different color tones are made to reverse so that images are rendered visible or invisible.

As the microcapsules, those of from 100 to 1,000 $\mu$m in size may preferably be used. As the magnetic particles encapsulated in the microcapsules, the same ones as those described previously may be used. With regard to the size of the magnetic particles, those of from 0.2 $\mu$m to several $\mu$m may preferably be used.

Particles having good light-reflecting properties, such as titanium oxide, may also be contained in the microcapsules so that the contrast between visible state and invisible state of images can be improved.

The magnetic pen used to draw images suitably on the magnetic display device constituted as described above has a magnetic part at least at the writing tip. In the case when the magnetic particles in the magnetic display device are the magnetic particles described above, such a magnetic part may be formed using an alloy type metallic material of any of iron, cobalt and nickel. In the case when the magnetic particles are the metallic material described above, magnetic materials such as magnetite, hematite, chromium dioxide and ferrite may be used. An electromagnet which exerts magnetism when electric current flows may also be used.

Its form is not limited to the form of a pen. Magnetic stamps whose magnetic members have the shape of letters, signs or figures, or magnetic heads may also be used.

Means for erasing images may include a means in which an erasing magnetic member is made to act on the back of the display member to erase images, and a means in which a movable erasing magnetic member provided on the back is operated on the surface of the display member to erase images.

On the surface of the magnetic display device, a figure of various games such as a maze and a sugoroku (a game of dice) may be provided, or a sheet having such a figure may be provided detachably.

A protective layer may also be provided suitably on the top of the magnetic display device.

The magnetic display device of the present invention may be embodied specifically as toys, teaching implements such as writing boards, memorandum boards, advertisement boards, and implements for amusement such as games of various types.

EXAMPLES

The present invention will be described in greater detail by giving Examples specifically. In the following, "part(s)" refers to "part(s) by weight".

Example 1

Figure 2:
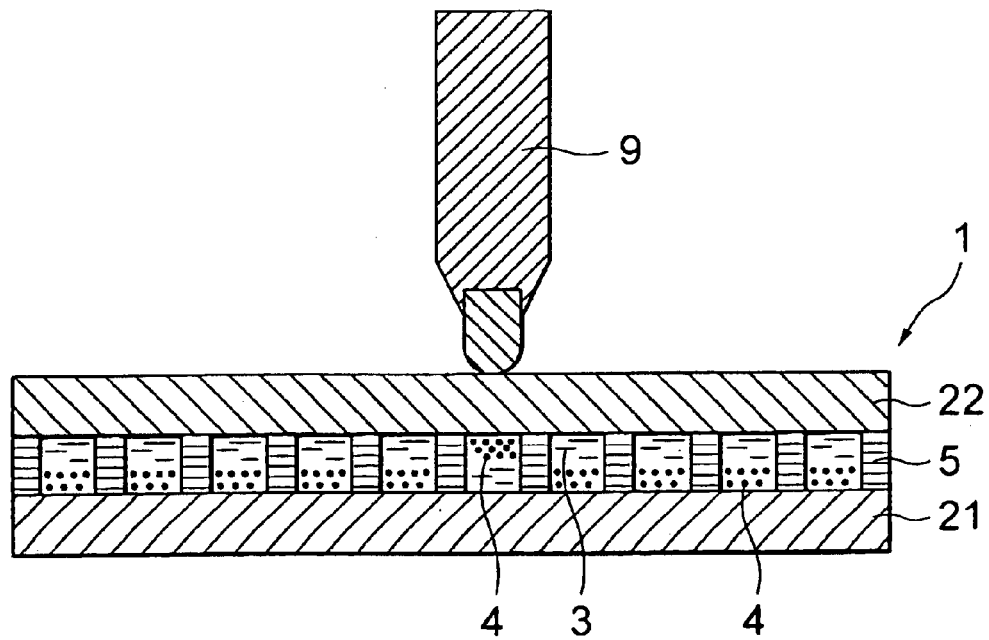
FIG. 2 is a cross-sectional illustration of a state where a magnetic pen is applied on the magnetic display device shown in FIG. 1.

(See FIGS. 1 and 2)

To a 0.3 mm thick polyvinyl chloride resin sheet a lower flat-sheet display member 21, a top-to-bottom open 1.3 mm thick multi-cellular board 5 having honeycomb-shaped (side length: 4 mm) closed cells (cell wall thickness: 0.05 mm) was bonded with an ethylene-vinyl acetate type emulsion adhesive. Into the cells, a disperse fluid was poured which was prepared by dispersing 9 parts of porous black iron oxide as magnetic particles 4 uniformly in 100 parts of a white dispersion medium obtained by mixing 100 parts of an isoparaffin solvent, 1 part of titanium oxide and 0.1 part of a nonionic surface-active agent thoroughly. Thereafter, using an epoxy resin, an upper flat-sheet display member 22 molded by calender-molding a uniform mixture of 100 parts of vinyl chloride resin, 3 parts of an epoxy resin type plasticizer and 10 parts of an iridescent luster pigment (trade name: IRIODINE 205; available from Merk & Co., Inc.) was laminated. Thus, a magnetic display device 1 was obtained.

When viewed from the side of the upper flat-sheet display member 22, the magnetic display device 1 presents a white color because of the dispersion medium 3 at the time the magnetic particles 4 stand settled.

Upon writing with a magnetic pen 9 on the upper flat-sheet display member 22 of the magnetic display device 1, the magnetic particles 4 having stood settled migrate up to the under surface of the upper flat-sheet display member 22 to form a black image which is perceived visually being gold by the aid of the iridescent luster pigment contained in the upper flat-sheet display member 22.

The gold image is erased by making a magnetic member act on the under surface of the magnetic display device 1 to make the magnetic particles 4 settle, and the magnetic display device returns to the original state, presenting a white color.

Example 2

Figure 3:
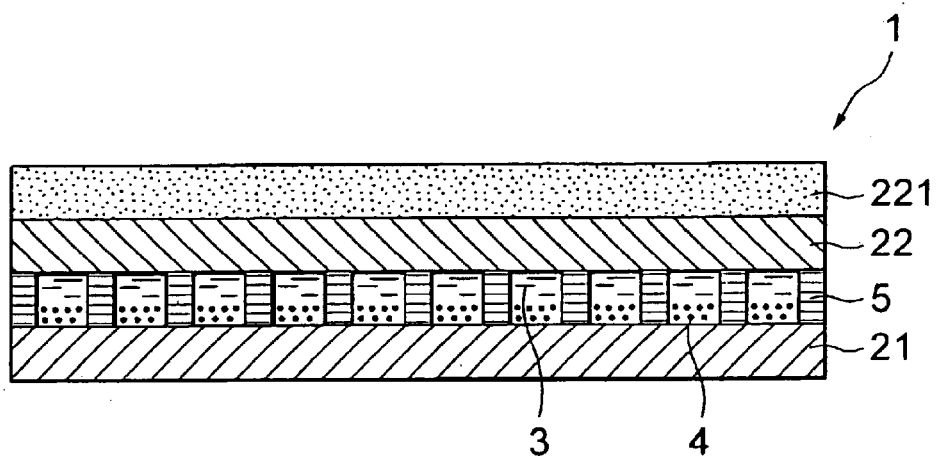
FIG. 3 is a cross-sectional illustration of another embodiment of the magnetic display device according to the present invention.

(See FIG. 3)

To a 300 μm thick polyvinyl chloride film as a lower flat-sheet display member 21, a top-to-bottom open 1.3 mm thick multi-cellular board 5 having honeycomb-shaped (side length: 4 mm) closed cells (cell wall thickness: 0.05 mm) was bonded with an ethylene-vinyl acetate type emulsion adhesive. Into the cells, a disperse fluid was poured which was prepared by dispersing 9 parts of porous black iron oxide as magnetic particles 4 uniformly in 100 parts of the same white dispersion medium as that in Example 1. Thereafter, using an epoxy resin, a polyvinyl chloride film as an upper flat-sheet display member 22 was laminated. Thus, a magnetic display device 1 was obtained.

On the top surface of the upper flat-sheet display member 22, an ink prepared by dispersing and mixing 5 parts of an iridescent luster pigment (trade name: IRIODINE 221; available from Merk & Co., Inc.), 15 parts of a vinyl chloride-vinyl acetate copolymer resin, 35 parts of xylene, 39 parts of ethyl acetate and 1 part of an anti-foaming agent was coated by doctor coating, followed by drying to provide a 50 μm thick luster layer 221.

When viewed from the side of the upper flat-sheet display member 22, the magnetic display device 1 presents a white color because of the dispersion medium 3 at the time the magnetic particles 4 stand settled.

Upon writing with a magnetic pen on the luster layer 221 of the magnetic display device 1, the magnetic particles 4 having stood settled migrate up to the under surface of the upper flat-sheet display member 22 to form a black image which is perceived visually being blue by the aid of the luster layer 221 provided on the upper flat-sheet display member 22.

The blue image having iridescent luster is erased by making a magnetic member act on the under surface of the magnetic display device 1 to make the magnetic particles 4 settle, and the magnetic display device returns to the original state, presenting a white color.

Example 3

Figure 4:
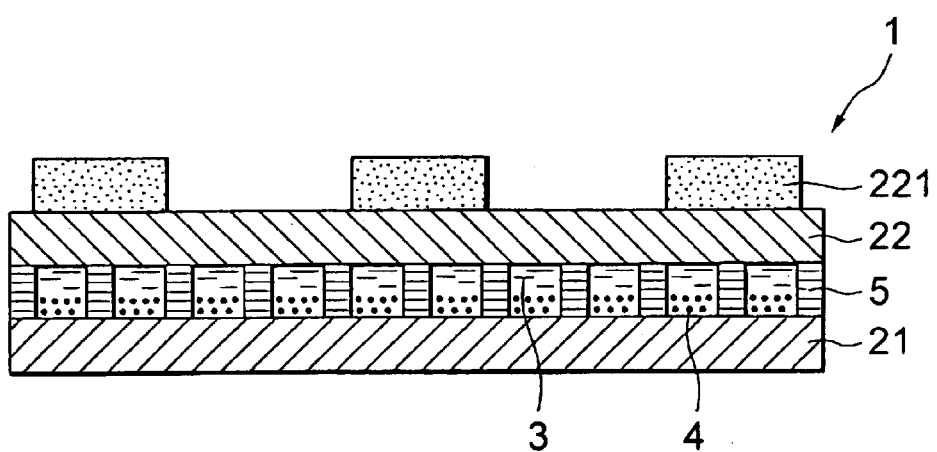
FIG. 4 is a cross-sectional illustration of still another embodiment of the magnetic display device according to the present invention.

(See FIG. 4)

To a 200 μm thick polyvinyl chloride film as a lower flat-sheet display member 21, a top-to-bottom open 1.3 mm thick multi-cellular board 5 having honeycomb-shaped (side length: 4 mm) closed cells (cell wall thickness: 0.05 mm) was bonded with an ethylene-vinyl acetate type emulsion adhesive. Into the cells, a disperse fluid was poured which was prepared by dispersing 9 parts of porous black iron oxide as magnetic particles 4 uniformly in 100 parts of the same white dispersion medium as that in Example 1. Thereafter, using an epoxy resin, a polyvinyl chloride film as an upper flat-sheet display member 22 was laminated. Thus, a magnetic display device 1 was obtained.

On the top surface of the upper flat-sheet display member 22, an ink prepared by dispersing and mixing 5 parts of an iridescent luster pigment (trade name: IRIODINE 100; available from Merk & Co., Inc.), 15 parts of a vinyl chloride-vinyl acetate copolymer resin, 35 parts of xylene, 39 parts of ethyl acetate and 1 part of an anti-foaming agent was applied by printing in a lateral-stripe pattern to provide a 50 μm thick luster layer 221.

When viewed from the side of the upper flat-sheet display member 22, the magnetic display device 1 presents a white color because of the dispersion medium 3 at the time the magnetic particles 4 stand settled.

Upon writing with a magnetic pen on the luster layer 221 of the magnetic display device 1, the magnetic particles 4 having stood settled migrate up to the under surface of the upper flat-sheet display member 22 to form a black image which is perceived visually being silver by the aid of the iridescent luster pigment at the part provided with the luster layer 221.

The black and silver image is erased by making a magnetic member act on the under surface of the magnetic display device 1 to make the magnetic particles 4 settle, and the magnetic display device returns to the original state, presenting a white color.

Example 4

Figure 5:
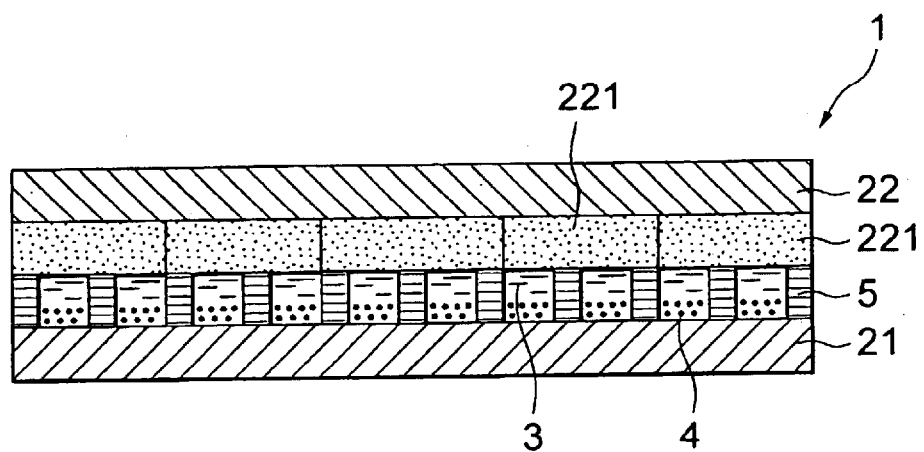
FIG. 5 is a cross-sectional illustration of a further embodiment of the magnetic display device according to the present invention.

(See FIG. 5)

To a 100 μm thick polyester film as a lower flat-sheet display member 21, a top-to-bottom open 1.3 mm thick multi-cellular board 5 having honeycomb-shaped (side length: 4 mm) closed cells (cell wall thickness: 0.05 mm) was bonded with an ethylene-vinyl acetate type emulsion adhesive. Into the cells, a disperse fluid was poured which was prepared by dispersing 9 parts of porous black iron oxide as magnetic particles 4 uniformly in 100 parts of the same white dispersion medium as that in Example 1. Thereafter, using an epoxy resin, a polyester film as an upper flat-sheet display member 22 was laminated. Thus, a magnetic display device 1 was obtained.

On the under surface of the upper flat-sheet display member 22, an ink prepared by dispersing 15 parts of an iridescent luster pigment (trade name: IRIODINE 225; available from Merk & Co., Inc.), 40 parts of an acrylate resin, 0.5 part of a silicone type anti-foaming agent, 20 parts of butyl acetate and 15 parts of an aromatic medium-boiling solvent uniformly and an ink prepared by dispersing 15 parts of an iridescent luster pigment (trade name: IRIODINE 219; available from Merk & Co., Inc.), 40 parts of an acrylate resin, 0.5 part of a silicone type anti-foaming agent, 20 parts of butyl acetate and 15 parts of an aromatic medium-boiling solvent uniformly were applied by screen printing in wave patterns adjoining to each other to provide luster layers 221.

When viewed from the side of the upper flat-sheet display member 22, the magnetic display device 1 presents a white color because of the dispersion medium 3 at the time the magnetic particles 4 stand settled.

Upon stamping with a magnetic stamp on the upper flat-sheet display member 22 of the magnetic display device 1, the magnetic particles 4 having stood settled migrate up to the under surface of the luster layer 221 to form a black image which is perceived visually being blue and violet wave patterns having iridescent luster by the aid of the luster layer 221.

The blue and violet images are erased by making a magnetic member act on the under surface of the magnetic display device 1 to make the magnetic particles 4 settle, and the magnetic display device returns to the original state, presenting a white color.

Example 5

Figure 6:
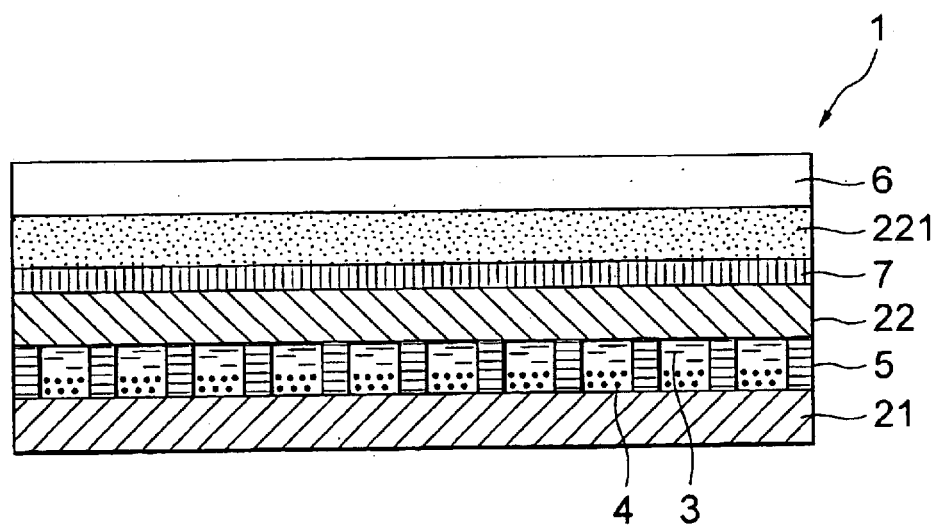
FIG. 6 is a cross-sectional illustration of a still further embodiment of the magnetic display device according to the present invention.

(See FIG. 6)

To a 300 µm thick polyvinyl chloride film as a lower flat-sheet display member 21, a top-to-bottom open 1.3 mm thick multi-cellular board 5 having honeycomb-shaped (side length: 4 mm) closed cells (cell wall thickness: 0.05 mm) was bonded with an ethylene-vinyl acetate type emulsion adhesive. Into the cells, a disperse fluid was poured which was prepared by dispersing 9 parts of porous black iron oxide as magnetic particles 4 uniformly in 100 parts of the same white dispersion medium as that in Example 1. Thereafter, using an epoxy resin, a 80 µm thick polyvinyl chloride film as an upper flat-sheet display member 22 was laminated.

Meanwhile, on a 12 µm thick polyester film as a support 6, an ink prepared by dispersing and mixing 5 parts of an iridescent luster pigment (trade name: IRIODINE 201;available from Merk & Co., Inc.), 30 parts of a xylene solution of acrylic resin (solid content: 50%), 10 parts of butyl acetate and 1 part of an anti-foaming agent was applied by gravure printing to provide a luster layer 221. On this luster layer 221, a toluene-ethyl acetate solution of acrylic resin (solid content: 40%) was coated, followed by evaporation of the solvent to form a pressure-sensitive adhesive layer 7, thus a lustrous seal was prepared.

The lustrous seal was put on the upper flat-sheet display member 22 with the former s pressure-sensitive adhesive layer 7 side down. Thus, a magnetic display device 1 was obtained.

When viewed from the side on which the lustrous seal is put on, the magnetic display device 1 presents a white color because of the dispersion medium 3 at the time the magnetic particles 4 stand settled.

Upon writing with a magnetic pen on the lustrous seal of the magnetic display device 1, the magnetic particles 4 having stood settled migrate up to the under surface of the upper flat-sheet display member 22 to form a black image which is perceived visually being gold by the aid of the iridescent luster pigment contained in the luster layer 221.

The gold image is erased by making a magnetic member act on the under surface of the magnetic display device 1 to make the magnetic particles 4 settle, and the magnetic display device returns to the original state, presenting a white color.

Example 6

To a 100 µm thick polyester film as a lower flat-sheet display member, a top-to-bottom open 1.0 mm thick multi-cellular board having regular triangular (side length: 4 mm) closed cells (cell wall thickness: 0.05 mm) was bonded with an ethylene-vinyl acetate type emulsion adhesive. Into the cells, a disperse fluid was poured which was prepared by dispersing 9 parts of porous black iron oxide as magnetic particles uniformly in 100 parts of a white dispersion medium obtained by mixing 100 parts of an isoparaffin solvent, 1 part of titanium oxide and 0.1 part of a nonionic surface-active agent thoroughly. Thereafter, using an epoxy resin, an iridescent film (trade name: MEARL IRIDESCENT FILM IF-8122 R/G; available from The Mearl Corporation) as an upper flat-sheet display member was laminated. Thus, a magnetic display device was obtained.

When viewed from the side of the upper flat-sheet display member, the magnetic display device presents a white color because of the dispersion medium at the time the magnetic particles stand settled.

Upon writing with a magnetic pen on the upper flat-sheet display member of the magnetic display device, the magnetic particles having stood settled migrate up to the under surface of the upper flat-sheet display member to form a black image which is perceived visually being iridescent because of the iridescence of the upper flat-sheet display member.

The iridescent image is erased by making a magnetic member act on the under surface of the magnetic display device to make the magnetic particles settle, and the magnetic display device returns to the original state, presenting a white color.

Example 7

To a 150 µm thick polyester film as a lower flat-sheet display member, a top-to-bottom open 1.0 mm thick multi-cellular board having honeycomb-shaped (side length: 5 mm) closed cells (cell wall thickness: 0.05 mm) was bonded with an ethylene-vinyl acetate type emulsion adhesive. Into the cells, a disperse fluid was poured which was prepared by dispersing 9 parts of porous black iron oxide as magnetic particles uniformly in 100 parts of a white dispersion medium obtained by mixing 100 parts of an isoparaffin solvent, 1 part of titanium oxide and 0.1 part of a nonionic surface-active agent thoroughly. Thereafter, using an epoxy resin, a 150 µm thick polyester film as an upper flat-sheet display member was laminated.

Next, an iridescent film (trade name: MEARL IRIDESCENT FILM IF-8122 R/G; available from The Mearl Corporation) was laminated to the top surface of the upper flat-sheet display member. Thus, a magnetic display device was obtained.

When viewed from the side on which the luster layer is provided, the magnetic display device presents a white color because of the dispersion medium at the time the magnetic particles stand settled.

Upon writing with a magnetic pen on the luster layer of the magnetic display device, the magnetic particles having stood settled migrate up to the under surface of the upper flat-sheet display member to form a black image which is perceived visually being iridescent because of the iridescence of the upper flat-sheet display member.

The iridescent image is erased by making a magnetic member act on the under surface of the magnetic display device to make the magnetic particles settle, and the magnetic display device returns to the original state, presenting a white color.

Example 8

To a 300 µm thick polyvinyl chloride film as a lower flat-sheet display member, a top-to-bottom open 1.0 mm thick multi-cellular board having square (side length: 3 mm) closed cells (cell wall thickness: 0.05 mm) was bonded with an ethylene-vinyl acetate type emulsion adhesive. Into the cells, a disperse fluid was poured which was prepared by dispersing 9 parts of porous black iron oxide as magnetic particles uniformly in 100 parts of the same white dispersion medium as that in Example 1. Thereafter, using an epoxy resin, a 80 µm thick polyvinyl chloride film as an upper flat-sheet display member was laminated.

Next, a transparent hologram film as a luster layer was laminated to the upper flat-sheet display member. Thus, a magnetic display device was obtained.

When viewed from the side on which the luster layer is provided, the magnetic display device presents a white color because of the dispersion medium at the time the magnetic particles stand settled, and a hologram with a pale tone is perceived visually.

Upon stamping with a magnetic stamp on the luster layer of the magnetic display device, the magnetic particles having stood settled migrate up to the under surface of the upper flat-sheet display member to form a black image which is perceived visually having a hologram tone with good luster because of the hologram appearance of the luster layer.

The image with a hologram tone is erased by making a magnetic member act on the under surface of the magnetic display device to make the magnetic particles settle, and the magnetic display device returns to the original white state having a hologram with a pale tone.

Figure 7:
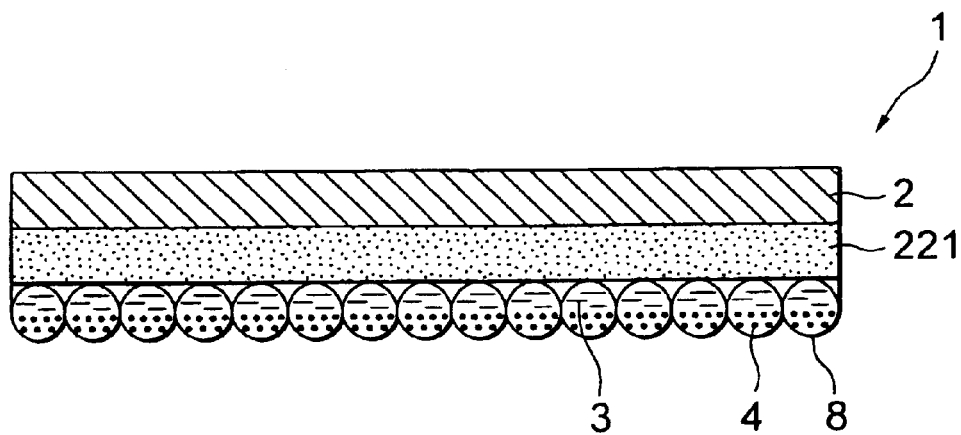
FIG. 7 is a cross-sectional illustration of a still further embodiment of the magnetic display device according to the present invention.

Example 9
(See FIG. 7)

In a white dispersion medium 3 prepared by dispersing in 84.5 parts of dibutyl phthalate 15 parts of titanium oxide powder (particle diameter: 0.3 µm) having been subjected to lipophilic treatment on its particle surfaces, 0.5 part of magnetite powder (particle diameter: 0.5 µm) as magnetic particles 4, containing 10% of manganese dioxide surface-treated with silicone was dispersed uniformly to obtain a dispersion.

Next, 200 parts of an aqueous 10% gelatin solution, 200 parts of an aqueous 10% gum arabic solution and 100 parts of water were mixed, and the mixture obtained was heated to about 50° C., followed by addition of an aqueous 10% acetic acid solution to adjust pH to 4 to obtain a solution. In this solution, 100 parts of the above dispersion was added, and the mixture obtained was so stirred that droplets of the dispersion came to be about 400 µm in size. After the mixture was cooled gradually by adding water, it was further cooled to 5° C., followed by addition of about 10 parts of an aqueous 25% glutaraldehyde solution. Gelatin/gum arabic polymer films thus precipitated on the interfaces of droplets of the dispersion medium were hardened to obtain microcapsules 8 containing the magnetic particles 4 and the white dispersion medium 3.

20 parts of the microcapsules 8 and 10 parts of an aqueous 10% polyvinyl alcohol solution were mixed to obtain a coating solution.

On a 50 µm thick polyester film as a flat-sheet display member 2, an ink prepared by dispersing 15 parts of an iridescent luster pigment (trade name: IRIODINE 205; available from Merk & Co., Inc.), 40 parts of an acrylate resin, 0.5 part of a silicone type anti-foaming agent, 20 parts of butyl acetate and 15 parts of an aromatic medium-boiling solvent uniformly was applied by screen printing to provide a luster layer 221. On this luster layer 221, the above coating solution was applied by doctor coating in a wet-coating thickness of about 500 µm, followed by drying to obtain a magnetic display device 1.

When viewed from the side of the flat-sheet display member 2, the magnetic display device 1 presents a white color because of the dispersion medium 3 at the time the magnetic particles 4 in the microcapsules 8 stand settled.

Upon writing with a magnetic pen on the flat-sheet display member 2 of the magnetic display device 1, the magnetic particles 4 having stood settled migrate up to the upper wall surfaces in the microcapsules to form a black image which is perceived visually being gold by the aid of the luster layer 221.

The gold image is erased by making a magnetic member act on the under surface of the magnetic display device 1 to make the magnetic particles 4 settle, and the magnetic display device returns to the original state, presenting a white color.

Figure 8:
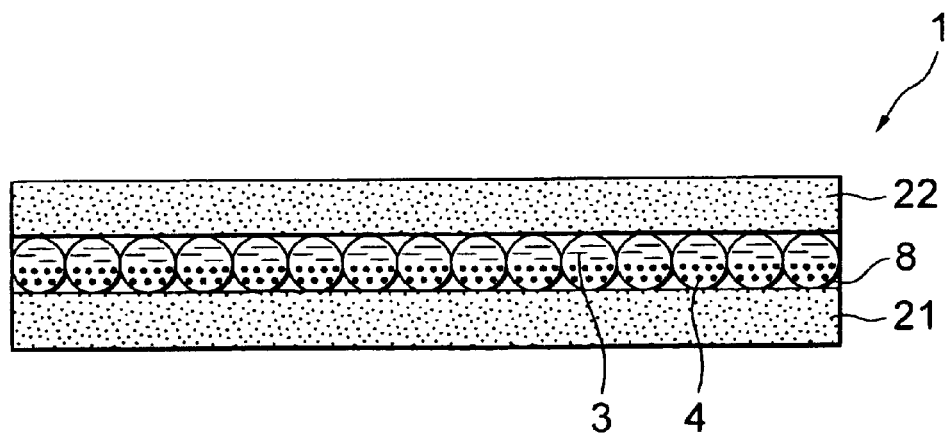
FIG. 8 is a cross-sectional illustration of a still further embodiment of the magnetic display device according to the present invention.

Example 10
(See FIG. 8)

As a lower flat-sheet display member 21, 100 parts of vinyl chloride resin, 3 parts of an epoxy resin type plasticizer and 10 parts of an iridescent luster pigment (trade name: IRIODINE 249; available from Merk & Co., Inc.) were mixed uniformly, followed by calender molding to obtain a polyvinyl chloride film having a gold-color iridescent luster.

As an upper flat-sheet display member 22, 100 parts of vinyl chloride resin, 3 parts of an epoxy resin type plasticizer and 10 parts of an iridescent luster pigment (trade name: IRIODINE 225; available from Merk & Co., Inc.) were mixed uniformly, followed by calender molding to obtain a polyvinyl chloride film having a blue-color iridescent luster.

A coating solution prepared by mixing 20 parts of the same microcapsules as those prepared in Example 9 and 10 parts of an acrylate emulsion (solid content: 35%) was applied on the above lower flat-sheet display member 21 by doctor coating in a wet-coating thickness of about 500 µm. Before the wet coating is dried, the upper flat-sheet display member 22 was bonded. Thus, a magnetic display device 1 having different iridescent luster on both sides was obtained.

When viewed from the side of the upper flat-sheet display member 22, the magnetic display device 1 presents a white color because of the dispersion medium 3 at the time the magnetic particles 4 in the microcapsules 8 stand settled.

Upon writing with a magnetic pen on the upper flat-sheet display member 22 of the magnetic display device 1, the magnetic particles 4 having stood settled migrate up to the upper wall surfaces in the microcapsules to form a black image which is perceived visually being a blue image having iridescent luster by the aid of the iridescent luster pigment contained in the upper flat-sheet display member 22.

The blue image having iridescent luster is erased by making a magnetic member act on the lower flat-sheet display member 21 to make the magnetic particles 4 settle, and the magnetic display device returns to the original state, presenting a white color.

When viewed from the side of the lower flat-sheet display member, the magnetic display device presents a white color because of the dispersion medium at the time the magnetic particles in the microcapsules stand settled.

Upon writing with a magnetic pen on the lower flat-sheet display member of the magnetic display device, the magnetic particles migrate up to the upper wall surfaces in the microcapsules to form a black image which is perceived visually being gold by the aid of the iridescent luster pigment contained in the lower flat-sheet display member.

The gold image is erased by making a magnetic member act on the upper flat-sheet display member 22 to make the magnetic particles 4 settle, and the magnetic display device returns to the original state, presenting a white color.

As described above, images can be formed by migration of magnetic particles in the dispersion medium, and also the images the magnetic particles form show luster such as iridescent luster, iridescence and hologram appearance. Thus, a magnetic display device can be provided which has superior applicability and also a high decorative effect.

What is claimed is:

1. A toy comprising:

a toy body with a magnetic display, said magnetic display comprising an upper transparent flat-sheet member formed of a non-magnetic material, a lower flat-sheet member formed of a non-magnetic material arranged parallel to said upper transparent flat-sheet member, and an admixture disposed between the flat-sheet members, said admixture comprising a dispersion medium, background pigments and magnetic particles, said upper transparent flat-sheet member having iridescent luster or iridescence, said iridescent luster being caused by iridescent luster pigments comprising natural mica particles (i) having a particle size of from 5–300 μm, the surface of said particles being coated with 14–68% by weight of titanium oxide with an optical thickness in a range of 110 to 415 nm, or (ii) coated by non-thermochromic dye or pigment or iron-oxide;

said toy further comprising a magnetic pen or magnetic stamp whereby, when said magnetic pen or magnetic stamp is sufficiently close to the upper transparent flat-sheet member, said magnetic particles migrate towards said upper transparent flat-sheet member to form an image with iridescent luster or iridescence visible through said upper transparent flat-sheet member, and said magnetic particles settle away from said upper transparent flat-sheet member in the absence of said magnetic pen or magnetic stamp, whereby said image and said iridescent luster or iridescence disappear.

2. A toy comprising:

a toy body with a magnetic display, said magnetic display comprising an upper transparent flat-sheet member formed of a non-magnetic material, and a plurality of microcapsules encapsulating an admixture fixed to the under surface of the transparent flat-sheet member, said admixture comprising a dispersion medium, background pigments and magnetic particles, said upper transparent flat-sheet member having iridescent luster or iridescence, said iridescent luster being caused by iridescent luster pigments comprising natural mica particles (i) having a particle size of from 5–300 μm, the surface of said particles being coated with 14–68% by weight of titanium oxide with an optical thickness of the coat being in a range of 110 to 415 nm, or (ii) coated by non-thermochromic dye or pigment or iron oxide;

said toy further comprising a magnetic pen or magnetic stamp whereby, when said magnetic pen or magnetic stamp is sufficiently close to the transparent upper flat-sheet member, said magnetic particles in said microcapsules migrate towards said upper transparent flat-sheet member to form an image with iridescent luster or iridescence visible through said upper transparent flat-sheet member, and said magnetic particles settle away from the upper transparent flat-sheet member in the absence of said magnetic pen or magnetic stamp, whereby said image and said iridescent luster or iridescence disappear.

3. A toy according to claim 1, said upper transparent flat-sheet member including a transparent non-magnetic layer and a separate luster layer.

4. The toy according to claim 2, further comprising a lower flat-sheet member formed of a non-magnetic material arranged parallel to said upper transparent flat-sheet member, said microcapsules being fixed between said upper flat-sheet member and said lower flat-sheet member.

5. The toy according to claim 2, said upper transparent flat-sheet member comprising a transparent non-magnetic layer and a separate luster layer.

6. The toy according to claim 4, said upper transparent flat-sheet member comprising a transparent non-magnetic layer and a separate luster layer.

* * * * *